United States Patent
Couturier et al.

(10) Patent No.: US 10,504,308 B2
(45) Date of Patent: Dec. 10, 2019

(54) METHOD FOR COLLECTING OPERATIONAL DATA OF AN AIRCRAFT

(71) Applicants: SAFRAN ELECTRONICS & DEFENSE, Boulogne Billancourt (FR); SAFRAN HELICOPTER ENGINES, Bordes (FR)

(72) Inventors: Emmanuel Couturier, Boulogne Billancourt (FR); Nicolas Fanton, Boulogne Billancourt (FR); Nicolas Lipari, Boulogne Billancourt (FR); Fabien Lamazere, Bordes (FR); François Thermy, Bordes (FR); Emmanuel Gaschignard, Bordes (FR)

(73) Assignees: SAFRAN HELICOPTER ENGINES, Bordes (FR); SAFRAN ELECTRONICS & DEFENSE, Boulogne-Billancourt (FR)

(*) Notice: Subject to any disclaimer, the term of this patent is extended or adjusted under 35 U.S.C. 154(b) by 0 days.

(21) Appl. No.: 16/462,169

(22) PCT Filed: Nov. 17, 2017

(86) PCT No.: PCT/EP2017/079620
§ 371 (c)(1),
(2) Date: May 17, 2019

(87) PCT Pub. No.: WO2018/091663
PCT Pub. Date: May 24, 2018

(65) Prior Publication Data
US 2019/0333298 A1    Oct. 31, 2019

(30) Foreign Application Priority Data
Nov. 17, 2016    (FR) ...................... 16 61163

(51) Int. Cl.
  *G07C 5/08*    (2006.01)
  *G06K 9/22*    (2006.01)
  (Continued)

(52) U.S. Cl.
  CPC ....... *G07C 5/0825* (2013.01); *G06F 3/04883* (2013.01); *G06K 9/00449* (2013.01);
  (Continued)

(58) Field of Classification Search
  CPC .................. G06K 9/00449; G07C 5/0825
  See application file for complete search history.

(56) References Cited

U.S. PATENT DOCUMENTS 8,892,273 B1    11/2014    Raghu et al.
8,958,945 B2 *    2/2015    Ovens ................ B64F 5/00
                                                  701/33.2
(Continued)

FOREIGN PATENT DOCUMENTS

FR    2 952 257 A1    5/2011
FR    3 022 418 A1    12/2015
WO    WO 2006/011141 A2    2/2006

OTHER PUBLICATIONS

Arosio et al. "Visual support and interaction for error prevention in aircraft maintenance", 2014 IEEE Metrology for Aerospace (MetroAeroSpace), pp. 372-376 (Year: 2014).*
(Continued)

*Primary Examiner* — Nay A Maung
*Assistant Examiner* — Jose Torres
(74) *Attorney, Agent, or Firm* — Muncy, Geissler, Olds & Lowe, P.C.

(57) ABSTRACT

A method for collecting operational data from an aircraft having a display screen for operational data. The method includes using a mobile terminal equipped with at least one optical sensor, images of the display screen are acquired in
(Continued)

such a way that at least some of the acquired images represent operational data displayed on the display screen; using an optical character recognition (OCR) module associated with said mobile terminal, character strings each representative of one piece of said operational data displayed on the display screen are identified in the acquired images; and using a report generation module and said identified character strings, an electronic report is generated containing at least some of said operational data of the aircraft.

10 Claims, 6 Drawing Sheets

(51) Int. Cl.
*G06F 3/0488* (2013.01)
*G06K 9/00* (2006.01)

(52) U.S. Cl.
CPC ............... *G06K 9/22* (2013.01); *G07C 5/085* (2013.01); *G06K 2209/01* (2013.01); *G06K 2209/03* (2013.01)

(56) References Cited

U.S. PATENT DOCUMENTS

| | | |
|---|---|---|
| 9,612,131 B2* | 4/2017 | Smailus ................. G01C 23/00 |
| 2003/0138146 A1 | 7/2003 | Johnson et al. |
| 2010/0214130 A1* | 8/2010 | Weinmann ......... G06K 9/00832 382/104 |
| 2013/0204487 A1 | 8/2013 | Ovens |
| 2018/0312272 A1* | 11/2018 | Murugappan .......... B64D 45/00 |

OTHER PUBLICATIONS

Carrico et al., "Mobile device integration in the cockpit: Benefits, challenges, recommendations", 2015 IEEE/AIAA 34th Digital Avionics Systems Conference, pp. 3B3-1-3B3-11 (Year: 2015).*

* cited by examiner

| << BACK | Flight report: Delete | Delete |

Aircraft information :

| Type : | Model : |
| Helicopter | xxx335xxx |

ID —

| Registration: | Aircraft S/N : |
| F-Mxxx | 1011xx |

Flight general information :

| Flight nature : | Last flight number: |
| VIP | 000 |

3 —

| First flight start date: | First flight end date: |
| 2015-02-10 | 2015-02-10 |

| First flight start time: | First flight end time: |
| 18:30:00 UTC+01 00 | 18:55:00 UTC+01 00 |

Flight time: 00:25:00

| First flight start place: | First flight end place: |
| 48°51.2046' N 2°20'55. E | 48°51.2046' N 2°20'55. E |

6 —

| SHOW MAP | SHOW MAP |

Aerial activity:

| Landing: | Airframe flight hour: |
| 1 | 00:25:00 |

METHOD FOR COLLECTING OPERATIONAL DATA OF AN AIRCRAFT

This invention relates to the field of collecting aircraft operational data.

BACKGROUND OF THE INVENTION

It is necessary to collect operational aircraft data to allow aircraft traceability in different aspects.

Among the operational data collected are aircraft identification data, aircraft configuration data, aircraft usage data, e.g. flight information, aircraft activity information such as time of use of aircraft equipment, or results of measurements made by aircraft instrumentation (e.g. exceeding thresholds relative to temperature, power, air temperature, air speed, rotational speed, fuel level, torque, etc.).

All this operational data is indicated when the aircraft is shut down by the aircraft's avionics display(s), for example the "aircraft and engine control display" screen(s) known by the acronym VEMD for "vehicle and engine multifunction display".

This data is generally entered manually by the operator, which can lead to collection errors that in turn lead to traceability problems.

The data collected in these flight reports may vary from one operator to another.

Thus, the completeness and reliability of the data collected is in no way guaranteed. This compromises the sharing of reliable data between operators.

PURPOSE OF THE INVENTION

The purpose of this invention is to provide a data collection method to solve some or all of the above disadvantages.

SUMMARY OF THE INVENTION

To this end, according to the invention, a method for collecting operational data from an aircraft is proposed, this aircraft comprising at least one screen for displaying aircraft operational data, the method being characterized in that:

using a mobile terminal equipped with at least one optical sensor, images from said display screen are acquired in such a way that at least some of the acquired images represent operational data displayed on the display screen;

using an optical character recognition (OCR) module associated with said mobile terminal, the acquired images allow character strings each representative of one of said operational data displayed on the display screen to be identified;

using a report generation module and said identified character strings, an electronic report is generated containing at least some of said aircraft operational data.

The invention facilitates the task of data collection by the operator.

The OCR module associated with this mobile terminal eliminates the need for manual data entry when generating the flight report on board the aircraft. This avoids some collection errors related to manual entry. The method according to the invention is time-saving.

Unlike a data collection device which would interface with the aircraft electronics to collect this data via electronic flow, the method according to the invention does not require the aircraft electronics to be adapted. Thus, the method according to the invention has no impact in terms of aircraft certification since it does not involve modifying the aircraft.

In addition, the adaptability of the method to different types of aircraft is particularly advantageous and cost-effective.

As will be seen below in the detailed description, the data/information collected through the method according to the invention can be of many types.

Thus, aircraft operational data include, for example, flight hours, engine cycle data, engine condition check results, or aircraft configuration data collected. This operational data is collected through the acquisition of screen image(s) and through character recognition applied to this/these image(s).

In a particular embodiment, the mobile terminal also includes a device for acquiring at least one piece of aircraft identification information that is carried by the aircraft.

In this mode, the mobile terminal is arranged:

on the one hand, to collect operational data via the acquisition of screen image(s) and the application of character recognition to this/these image(s); and on the other hand, to collect identification information carried by the aircraft (typically information stored on labels and/or optical cryptograms attached to the aircraft or displayed by an aircraft screen(s)).

Operational data are generally variables that change during aircraft use (e.g. flight time) while identification information acquired using the acquisition terminal device are generally fixed data that represent, for example, the identity of the aircraft or a technical configuration of the aircraft (e.g. the identification of an aircraft equipment, a particular combination of aircraft equipment or an equipment version).

The method collects operational data, aircraft identification information and/or information/data related to the operator collecting the operational data. All this operational data, identification information and information/data relating to the operator are preferably recorded in the same electronic report.

Thanks to the method according to the invention, the time required to generate a complete electronic report is particularly short (ideally less than 5 minutes).

According to a preferred embodiment of the invention, the acquisition of operational data delivered via said screen and at least one aircraft identification information acquired using an acquisition device, as well as one or more aircraft configuration pieces of information (e.g. aircraft engine(s) configuration information, aircraft functional unit (LRU) configuration information) are successively carried out and these operational data and identification information acquired successively are stored in the same electronic report.

The advantage of acquiring in a single non-interruptible process (Flight Report), on the one hand, an image of the screen displaying operational data and, on the other hand, aircraft identification information describing the identity of the aircraft and/or the configuration of all or part of the aircraft, is that it makes the data and information collected and recorded in the report reliable. This reduces the risk that the electronic report will contain data and information collected at different times and from sources that are not consistent with each other. This improves the reliability of the report.

Preferably and according to this last embodiment, after said acquisition of said operational data and said aircraft identification information, an image of the operator using the mobile terminal is acquired and this image of the operator is stored in the electronic report.

This embodiment improves the traceability of data collection since the operator who acquired the data recorded in the report is recognizable by his/her image recorded in said report. All these qualities promote better traceability and completeness of the data. By improving traceability and validating exhaustiveness, the invention improves the quality of aircraft maintenance information and ultimately the safety of the aircraft.

To promote this exhaustiveness of data collection, the collection method according to the invention may include a step of verifying the image obtained using said optical sensor. This verification step may consist in ensuring that the image obtained represents the entirety of a given display screen. If this is the case, the image obtained is considered as an acquired image to be taken into account by the optical character recognition module. Otherwise, if only a portion of the screen is represented in the acquired image or if the image is cloudy (characters difficult to recognize), then the operator may be asked to generate a new image of this display screen until an image of the entire screen is obtained. In this embodiment, only an image obtained featuring the entirety of a given display screen is considered to be an acquired image of the screen to be processed by the optical recognition module.

In addition, again to promote the exhaustiveness of data collection, the method ensures that the list of screens that have been submitted to optical recognition is complete.

BRIEF DESCRIPTION OF THE DRAWINGS

Other characteristics and advantages of the invention will be readily apparent from the following detailed description, given by way of non limiting examples, while referring to the appended drawings, in which.

DETAILED DESCRIPTION OF THE INVENTION

As indicated above, the invention concerns a method for collecting operational data from an aircraft 1. The aircraft cockpit is shown in FIGS. 1, 2, 3, 4a, 4b, 5 and 7.

Said aircraft has at least one display screen 2 displaying operational data 3 of the aircraft. In this case, aircraft 1 shown is a helicopter with several display screens on the instrument panel. Each of said screens 2 is controlled by selection means (not detailed), preferably manually activated by the operator, in order to select for each screen 2, the page P1, P2 of operational data to be displayed.

As shown in the various figures, operational data for the aircraft may include:

(A) aircraft identification data, for example, aircraft type (helicopter), aircraft model (e.g. H225), aircraft serial number or other aircraft identifier;

(B) aircraft configuration data, such as the type/serial number of the engine or rotor with which the aircraft is equipped, type/serial number of the man-machine interface, aircraft part or system identifiers (these configuration data may also be recorded on a cryptogram or electronic medium carried by the aircraft and readable via the acquisition device integrated in the mobile terminal);

(C) data relating to the use of the aircraft, for example:
information relating to one or more given flights such as, the nature of the flight (VIP flight, test flight . . . ), the flight number, the flight start time/date (Departure time, flight start time), the flight end time/date (flight end time), the flight duration (Operating time/Flight time), the flight departure location (Flight start place), the flight arrival location (Flight end place);
information relating to Aerial activity during the flight such as: the operating time of aircraft equipment, particular operating conditions detected by the aircraft instrumentation, such as temperature thresholds overruns or overheating, mechanical overload, and any operating information relevant to performing a corrective maintenance operation, predictive, preventive or conditional (flight hours, data relating to engine cycle (s), or engine condition check results, operating time of a gas generator, an observed operating efficiency of one or more equipment, wear rate of a part . . . ).

All this operational data is displayed when the aircraft is stopped by the aircraft's avionics display screen(s) such as the "aircraft and engine control display" screen known by the acronym VEMD for "vehicle and engine multifunction display". There may be one screen per category of information. For example, a screen can be dedicated to displaying information on deviations in the functioning of aircraft components reported by the FADEC (Full Authority Digital Electronic Control).

Of course, the operational data 3 collected using the method according to the invention may include many other data.

The method for collecting operational data according to the invention is essentially characterized in that:

using a mobile terminal 4 equipped with at least one optical sensor (typically a rear camera of the mobile terminal), images 5 of said display screen 2 are acquired in such a way that at least some of the acquired images represent operational data 3 displayed on display screen 2;

using an optical character recognition (OCR) module associated to/integrated into the mobile terminal 4, the acquired images 5 allow character strings C1, C2, each representative of one of said operational data 3 displayed on the display screen 2, to be identified; and using a report generation module and said identified strings C1, C2, an electronic report 6 is generated containing at least some of said operational data 3 of aircraft 1.

Since operational data 3 is generally displayed at the end of the flight via avionics screens such as VEMD displays, the method according to the invention is essentially implemented when the aircraft is stopped, engines/turbines stopped and rotors stationary.

The said mobile terminal 4 includes a device for acquiring aircraft identification information carried by the aircraft.

This acquisition device (not shown in the figures is, in this example, integrated into the mobile terminal) makes it possible to acquire an aircraft ID and/or aircraft configuration identification carried by the aircraft. This acquisition device is for example an optical sensor of terminal 4 adapted to capture an image of an aircraft-specific identification mark or visual cryptogram 7 (potentially aircraft-specific in a given hardware configuration at time t, i.e. equipped with certain optional or non-optional hardware sub-assemblies) and carried by the aircraft. Such a visual cryptogram 7 is illustrated schematically in FIG. 4*a*.

This acquisition device may include a set of Near Field Communication (NFC) means such as RFID (Radio Frequency Identification) or other means, arranged to read the aircraft ID and/or configuration information on an electronic tag 8 placed in the aircraft. Such an electronic tag 8 is schematically illustrated in FIG. 4*b*.

The report generation module is designed so that the electronic report 6 it generates combines this aircraft identification information with the aircraft operational data 3 contained in the report.

To improve the reliability of the collection via the method according to the invention, it is advantageous to collect the identification information using a medium for this particular ID information, for example separate from display screen 2.

This ensures that aircraft identification is verified through a source of information other than the characters displayed on the display screen. A dual source of ID identification information can be used to verify that the ID displayed on screen 2 is the same as the one obtained using the medium carrying the information (tag or cryptogram).

It should be noted that this information medium is chosen from an identification mark or a visual cryptogram 7 or a tag 8 equipped with near field communication means or the display of an optical cryptogram on a screen.

The data recovery step using an NFC protocol or optical cryptogram ensures that the mobile terminal is close to the vehicle when the ID information is acquired by terminal 4. This limits the risk of interaction with an external agent during this acquisition.

The mobile device 4 can be for example a smartphone, or a touch pad or a computer or any other mobile computing device. Terminal 4 also includes at least one processor and at least one memory that are connected to a display screen 9 and the optical sensor. The mobile terminal is thus adapted to the implementation of the method.

The terminal's display screen 9 is designed to:

on the one hand, to visualize the images 5 acquired by the optical sensor during this acquisition; and on the other hand, display the electronic report 6 for the attention of an operator.

Mobile terminal 4 also includes signature means to allow the operator viewing the electronic report 6, possibly to modify it and then sign it, if appropriate.

These means of signature may be associated with a biometric authentication device of the operator, the signature of the electronic report by the operator then being authorized only if this operator has been previously identified by the biometric authentication device.

Figure 6:
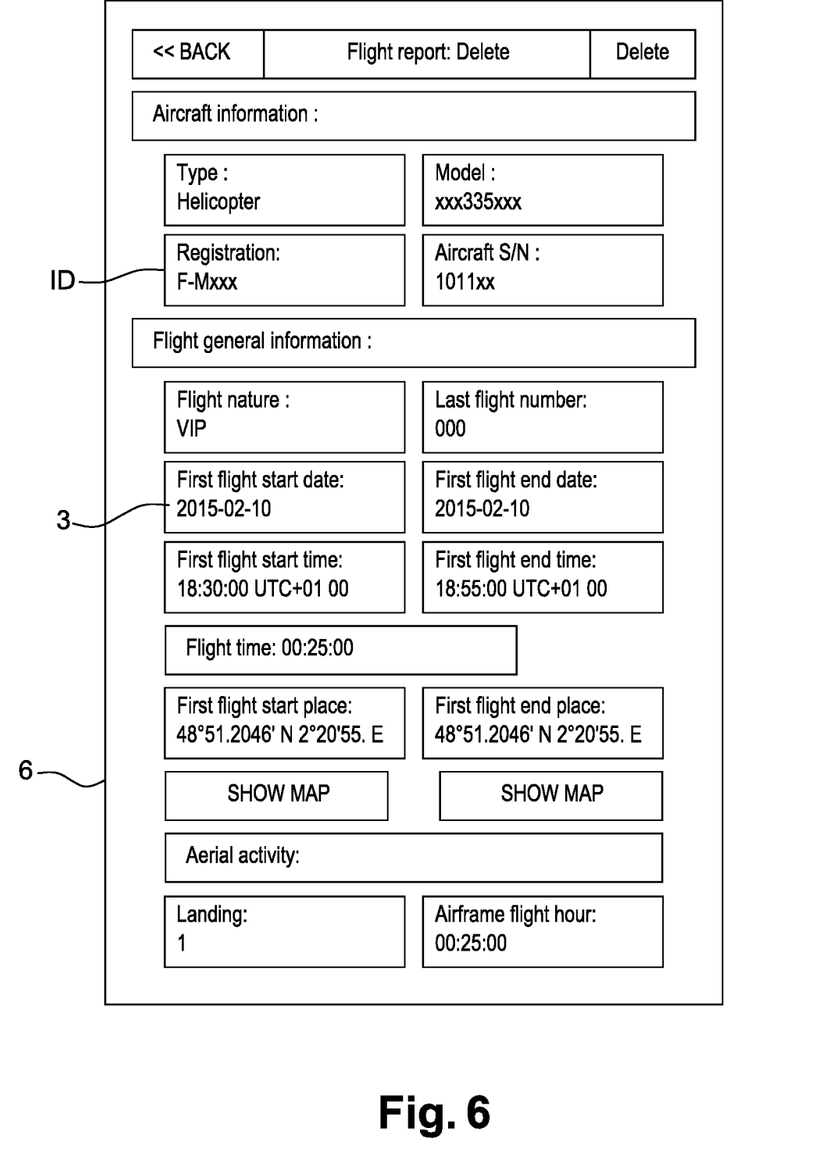
FIG. 6 illustrates an example of one of the pages of a report generated by the report generation module integrated into the mobile device.

In the example illustrated in particular in FIG. 6, the authentication device is a facial recognition device coupled with a camera integrated into the mobile device. This camera is a front camera installed on a first side of the mobile terminal that is opposite to a second side of the mobile terminal where the optical sensor is located for acquiring screen images 2.

The identification of the operator and the aircraft ID/configuration are associated with a number of rights authorizing or not the operator to generate given portions of report 6. Advantageously, this double identification can also open rights of access to other services such as CRM (Customer relationship management), digital community or other.

Depending on whether the operator is a pilot, mechanic or maintenance worker or controller, Terminal 4 can adapt the report generation procedure to the operator's function.

As shown in particular in FIG. 6, the mobile terminal can be functionally linked to a BD1 database containing several pre-determined electronic report templates. Each given report model corresponds to a given aircraft type/configuration that is itself identifiable via the identification information of that aircraft.

The report generation module is designed so that upon receipt of the identification information of the aircraft from which data is to be collected, it obtains from the BD1 database a given electronic report template corresponding to that aircraft in its given configuration.

The electronic report 6 generated by the report generation module is generated from the report template obtained from the BD1 database.

As the report template is specifically adapted to the identified aircraft, this report contains data fields 3 to be completed in the order in which they are displayed on the different pages P1, P2 displayed on screens 2. This facilitates the tasks of optical recognition and visualization of the acquired data.

The fields to be completed in this template can be displayed or not depending on the profile of the operator.

Figure 1:
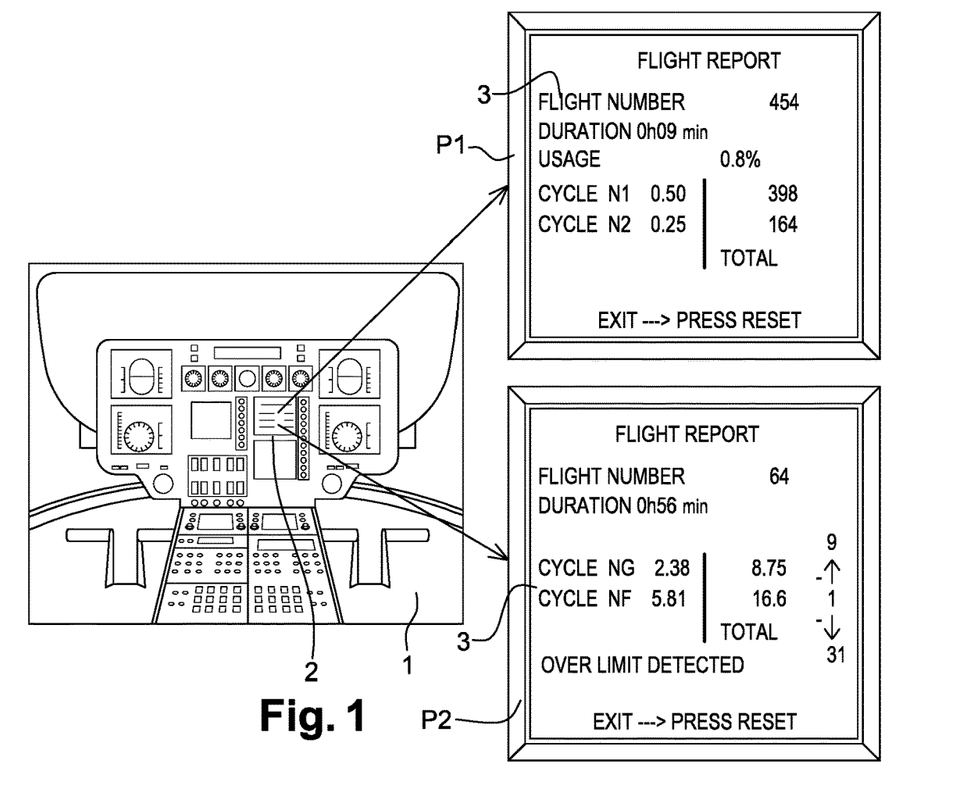
FIG. 1 shows an aircraft cockpit with several screens displaying aircraft operational data.

As previously indicated, the aircraft has means for selecting the page to be displayed on said display screen 2 from a predetermined set of displayable pages P1, P2. As shown in FIG. 1, each given page P1, P2 displayed contains a set of aircraft operational data 3.

Mobile terminal 4 can also be linked to a BD2 database of data collection scenarios 3. Each given data collection scenario in this BD2 database corresponding to a given aircraft type that is itself identifiable via the identification information of that aircraft.

The report generation module is designed so that upon receipt of the aircraft's ID information, it obtains from the BD2 database a data collection scenario corresponding to that aircraft.

Then, in response to this data collection scenario, the report generation module issues instructions to the operator for the selection of the page to be displayed on said at least one display screen 2.

The terminal acquires images 5 of each of pages P1, P2 successively displayed on screen 2. These images are then used to generate the report 6.

With this functionality, the operator follows a predetermined scenario specific to aircraft 1 and its configuration. This scenario guides him/her to display a predetermined sequence of pages P1, P2 on screen 2 and to acquire the images allowing a predetermined set of operational data to be obtained.

The risk of forgetting pages or data to be collected is thus limited. If the acquisition of a page is not carried out according to the scenario, the report generation module can indicate this to the operator and possibly write it in the report to attract his/her attention.

In the case where the aircraft has several display screens, the data collection scenario corresponding to that aircraft is designed so that, when executed, it causes the issuance of instructions for image acquisition of each of those screens, one after the other. The instructions given to the operator by the terminal can be visual via screen 9 and/or audible via a loudspeaker of terminal 4.

Each of these databases BD1, BD2 of report templates or data collection scenarios can be implemented on the mobile device (in a memory of this device) or be remotely accessible from the mobile device via a network 10 connecting the database to the mobile device. These databases BD1, BD2 can be combined into a single database linked to the report generation module.

Ideally, the optical character recognition (OCR) module can be arranged to detect in the acquired image the current page displayed on the at least one aircraft display screen and to command the issuance of an instruction to the operator once an image of a page expected according to the scenario has been acquired. Contextual guidance is thus given to the operator to guide him/her in the selection and acquisition of images.

The report generation module is such that the electronic report 6 it generates contains an electronic signature specific to the operator. This signed report can be in PDF format or any other format that can be transmitted without damaging the report and can be made uneditable to render it tamper-proof.

Preferably, the electronic signature includes identification information of the operator such as his/her photo taken at the time of signing and/or a manual and/or voice and/or electronic signature via a password entered by the operator. This information can be inserted in the signed report to authenticate the link between the operator and the finalized report.

The generation of the report may include, in addition to the signature of the report, a preliminary step of visualization of the data contained in the report ready for signature and one or more steps of validation of these data, the signature being entered after the validation steps. It should be noted that the report is regularly recorded on the terminal and/or on a remote server at different stages of its preparation.

The signature of the report may include the use of a private key from which the signature is generated, this signature being preferably conditioned to a prior biometric authentication of the operator; the private key may be stored in the terminal or in a key holder separate from the terminal and readable by the latter. The terminal can thus be used by several operators without having to store the private key of each operator in the terminal. This facilitates the use and portability of the mobile device.

The report may contain information relating to its preparation, such as the start time of the report and the time of signature of the finalized report.

The electronic report 6 generated by the method according to the invention combines, in the same report, validated by the operator:

operational data 3 specific to aircraft 1 (this is the data obtained from reading screen 2);

aircraft ID/configuration information obtained from the information acquisition device; and an identification information of the operator who generated report 6, this information being associated with the signature specific to the operator (the signature can be done by validating the report via a validation key after checking the identity of the operator for example via a biometric analysis of an image of the operator's face acquired at the time of signature).

The implementation chronology of the method according to the invention will now be explained.

FIG. 1 corresponds to a time at the end of the flight, when the helicopter has landed and the pilot has turned off the engines. The VEMD then automatically displays the flight end data on its screen 2. Examples of pages P1, P2 displayed are shown to the right of FIG. 1. These pages each present the aircraft's operational data 3.

Figure 2:
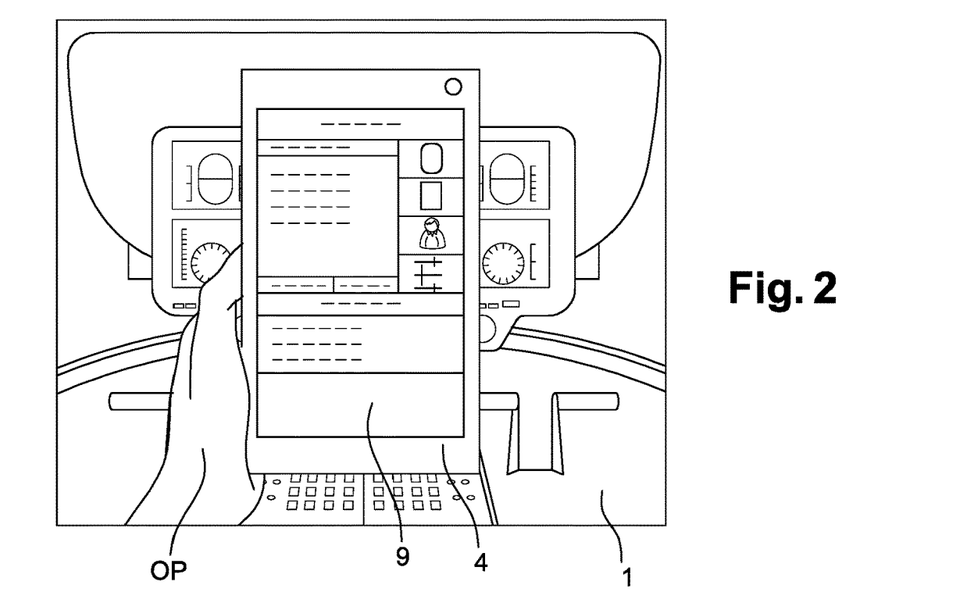
FIG. 2 illustrates a first step of the method according to the invention in which the operator uses a mobile terminal to start collecting aircraft identification information and/or aircraft configuration information, as well as aircraft screen images via an optical sensor integrated into the mobile terminal.

FIG. 2 illustrates when the operator OP, in this case the pilot, launches the data acquisition application (also known as the report generation module) on his smartphone or touch pad (standard commercial hardware) and starts the data collection function in accordance with the method according to the invention. He/she will now be able to recover flight data 3.

Figure 3:
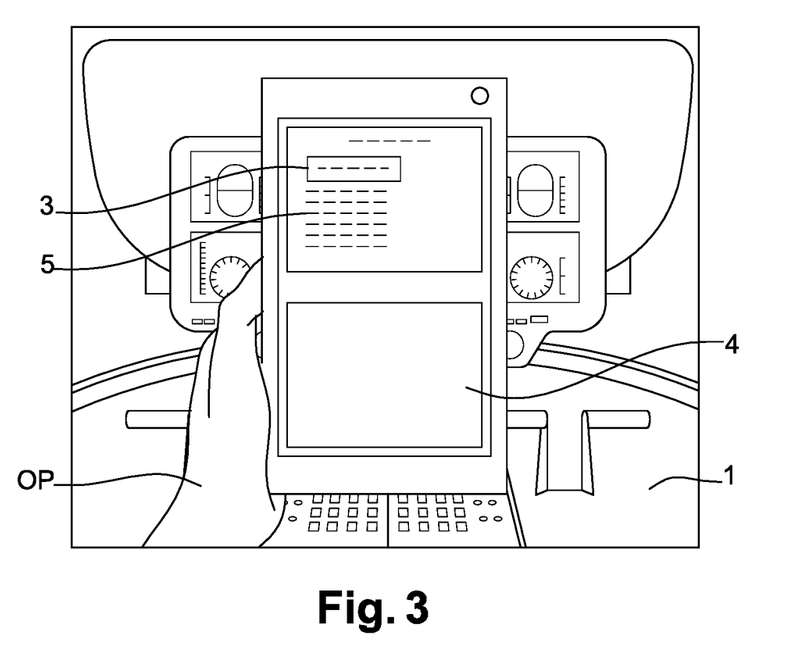
FIG. 3 illustrates a second step of the method according to the invention wherein the operator acquires an image of a screen, this image being displayed on a display screen of the mobile terminal.

FIG. 3 shows the moment when the terminal application displays, in real time, via a display screen 9 of terminal 4, what is captured by the image acquisition sensor (the rear camera of the terminal). A touch button allows the operator to control the acquisition of the images of interest to him.

In this case, the pilot uses the application to take pictures of the different screens 2 of the VEMD to acquire the data 3 displayed.

In a particular embodiment, during this first image acquisition in FIG. 3, the OCR can recognize in the acquired image from screen 2 the aircraft identification information (ID) and/or the aircraft configuration information.

Figure 4A:
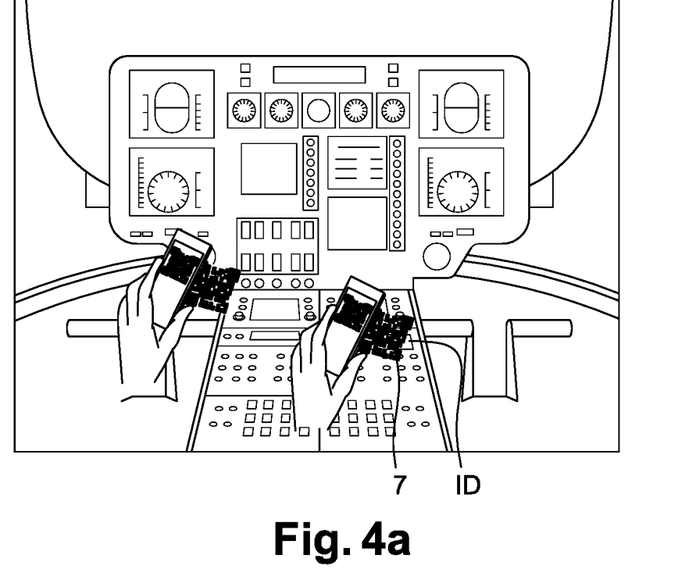
FIG. 4a illustrates a first alternative step wherein the operator collects at least one piece of aircraft identification information (e.g. aircraft identity information or aircraft configuration information) by optically acquiring information written on a cryptogram (QR code-type matrix image code or flash code or any other suitable optical markers) fixed in the cockpit near the display screens.
Figure 4B:
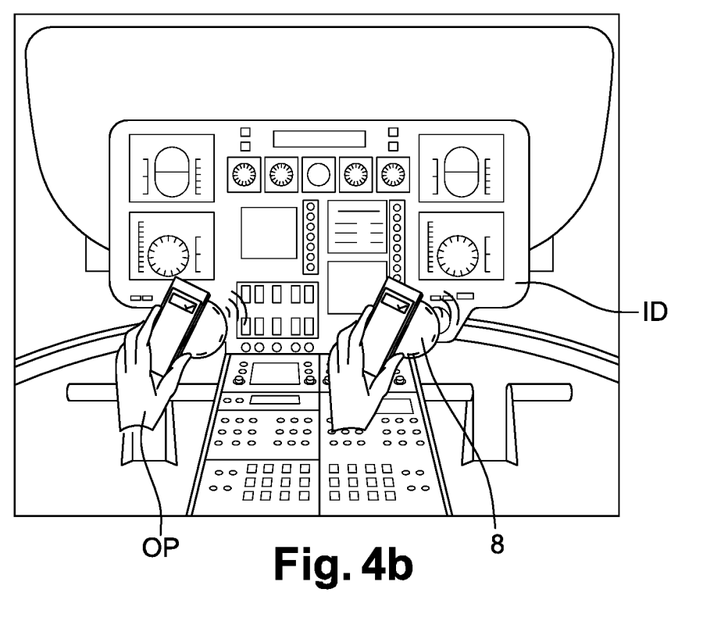
FIG. 4b illustrates a second alternative step wherein the operator collects at least one piece of aircraft identification information (e.g. aircraft identity information or aircraft configuration information) by acquiring information recorded on an electronic medium, such as an electronic tag attached to the instrument panel and equipped with near field communication means.

FIGS. 4*a* and 4*b* illustrate two alternative embodiments that correspond to the moment when the pilot uses the application to identify aircraft ID information and possibly some fixed operational data such as the aircraft hardware configuration. Either, as in FIG. 4*a*, the operator obtains this information via a photo of labels attached for this purpose on the instrument panel (QR code for example), or, as in FIG. 4*b*, the operator obtains this information by reading passive contactless electronic tag(s) (e.g. NFC).

Both technologies used are passive and do not impact the airworthiness of the aircraft. These are also in use by the general public and do not require any specific material evolution of the aircraft.

Once this aircraft ID and/or configuration information has been acquired and possibly after verification of this aircraft ID and/or configuration and/or of a match between this ID and configuration, the terminal via its report generation module can search a database DB1 for a report template corresponding to this aircraft (i.e. a report template corresponding to the aircraft ID and/or configuration) and search a database DB2 for a specific data collection scenario for this aircraft.

The operator, in accordance with the collection scenario, activates the selection means to scroll through pages P1, P2 on the aircraft screens, and acquires images of them.

Figure 5:
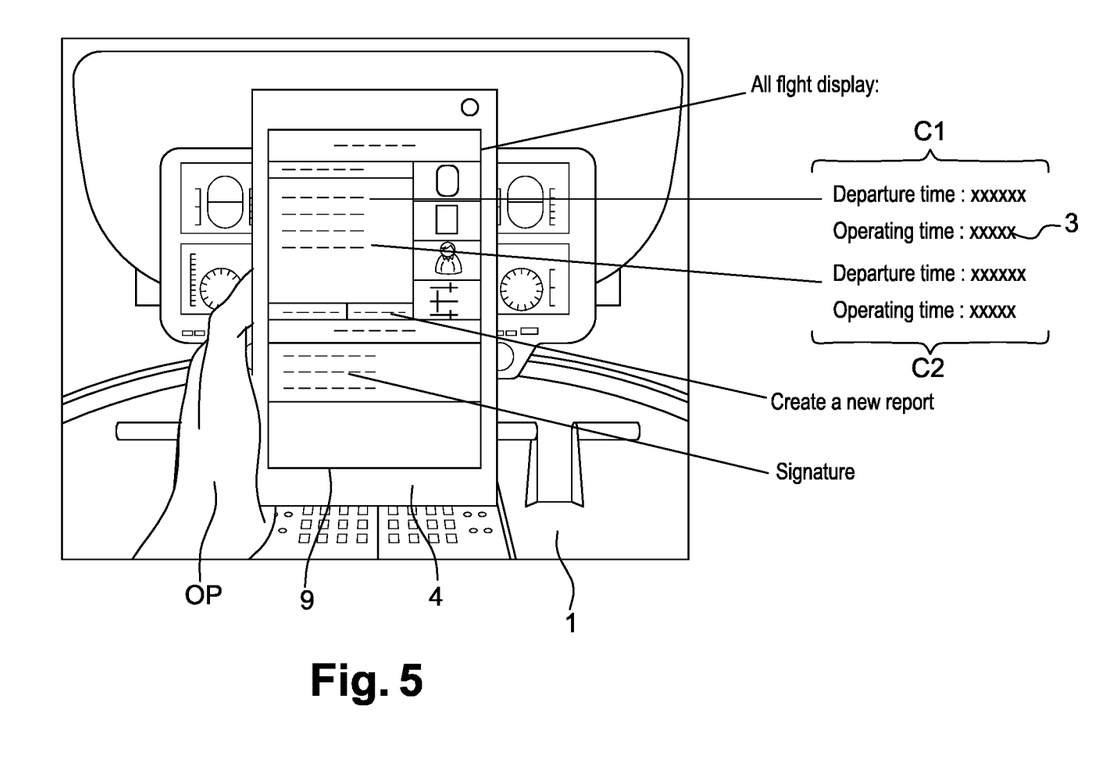
FIG. 5 illustrates the identification, in the acquired image, of character strings representative of the operational data displayed by the aircraft screen.

FIG. 5 illustrates when, for each page acquired in this way, according to the predetermined report template, the application uses character recognition (OCR module having benefited from learning the specific characters of the VEMD and the specific content of the "VEMD Flight Report" pages) to extract character strings C1, C2 representative of the data in the photos thus taken. The application automatically completes the Electronic Flight Report. The pilot must control what is recognized by the OCR on the display of pad 4, however, the source photo of the OCR is retained as evidence and inserted in the report.

FIG. 6 illustrates an example of a page of an electronic report 6 generated in this way. The pilot checks the pages of this report and then starts the report signature function.

Figure 7:
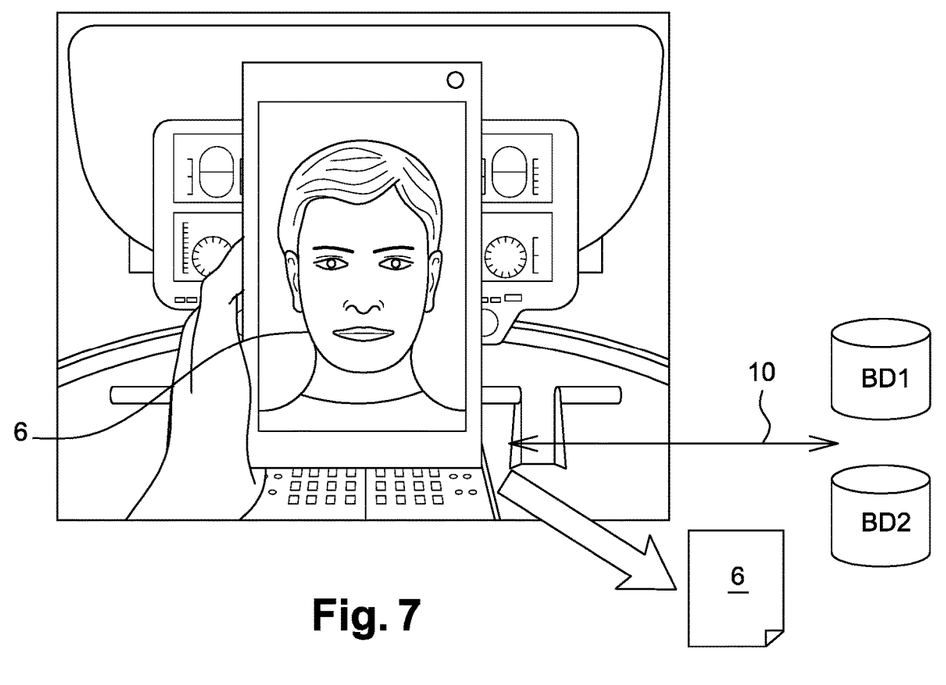
FIG. 7 illustrates the report signature step during which, after manually validating the data entered using the mobile terminal, a photograph of the operator is acquired by the mobile terminal and biometric recognition (e.g. facial, fingerprints, . . . ) of the operator is implemented to validate the signature of the report by the operator.

FIG. 7 illustrates when the application displays a camera interface (real-time display of what the front camera picks up and a touch screen user interface button) with instructions specific to biometric authentication.

Once the authentication has been confirmed, the report 6 is digitally signed and then stored and possibly transmitted via a network 10.

The photo that has undergone facial authentication processing is stored and displayed as an insert for proof on the digitally signed PDF flight report 6.

In summary, the method for collecting data 3 according to the invention facilitates the generation by the operator OP of an electronic report 6 of which the information is securely entered at the aircraft 1 site itself, while the operator has the aircraft's screens 2 in front of him.

In one particular embodiment, the generation of the electronic report in a validated state can only be allowed if it has been issued within a predetermined time frame, for example based on aircraft identification information. This allows the operator to be allocated a predetermined time to complete the report, depending on the particularities of the aircraft.

If the report is completed and signed within this time frame, it is known that the chances of the operator tampering with the report are particularly low. The report is then set to the validated state.

Otherwise, if the report generation time is greater than the predetermined period of time, then the report may not be allowed to pass into a validated state because it is likely to contain data/information that is scattered/inconsistent with one another. This report status information is used to attract attention when the time required to prepare the electronic report seems unusually long.

The method according to the invention thus includes the automatic acquisition of aircraft ID information/data 3 using the mobile terminal 4, the human verification carried out by the operator at the aircraft 1 site and finally the signature by the operator allowing the final report 6 integrating the identification data of the operator to be generated. The identification data of the operator may include his manual or biometric signature (e.g. recognition of fingerprints, palm, face, iris, voice, etc.) supplemented by a manual validation (by pressing a contextual validation button) or voice validation (by pronouncing a voice order to validate the report).

This data/information acquisition chain is therefore particularly secure.

The invention claimed is:

1. A method for collecting operational data from an aircraft, the aircraft comprising at least one display screen for operational data of the aircraft, the method comprising:
using a mobile terminal equipped with at least one optical sensor, images of said at least one display screen are acquired in such a way that at least some of the acquired images represent operational data displayed on the display screen;
using an optical character recognition (OCR) module associated with said mobile terminal, character strings each representative of one piece of said operational data displayed on the display screen are identified in the acquired images;
using a report generation module and said identified character strings, an electronic report is generated containing at least some of said operational data of the aircraft;
the mobile terminal being functionally linked to a database containing several predetermined electronic report templates, each predetermined report template corresponding to a given aircraft type itself identifiable via the identification information of that aircraft, the report generation module being arranged so that upon receipt of the identification information (ID) of the aircraft of which data is to be collected, it obtains from the database a given electronic report template corresponding to that aircraft, the electronic report generated by the report generation module being generated from the report template obtained from the database.

2. The method for collecting data according to claim 1, wherein said mobile terminal includes a device for acquiring at least one aircraft identification information (ID) carried by the aircraft, the report generation module being arranged so that the electronic report generated by it associates at least one aircraft identification information (ID) with the aircraft's operational data contained in the report.

3. The method for collecting data according to claim 2, in which the acquisition of operational data delivered via said screen and of at least one aircraft identification information are successively carried out using said acquisition device, said identification information being aircraft identifying information, as well as one or more aircraft configuration information, and these operational data and identification information successively acquired are stored in the same electronic report.

4. The method for collecting data according to claim 3, in which, after said acquisition of said operational data and said at least one aircraft identification information, an image of the operator is acquired using the mobile terminal, this image being stored in said electronic report.

5. The method for collecting data according to claim 2, wherein the aircraft identification information (ID) is written on an information medium carried by the aircraft, this medium being selected from an identification mark or visual cryptogram or a tag with near-field communication means or an optical cryptogram displayed on a screen.

6. The method for collecting data according to claim 1, wherein said mobile terminal includes a display screen arranged to display the images acquired by the optical sensor during this acquisition and to display the electronic report to an operator (OP), the mobile terminal also including signature means to allow the operator viewing the electronic report to sign it he/she is satisfied with the report, said signed electronic report containing an electronic signature specific to the operator (OP).

7. The method for collecting data according to claim 6, in which the signature means are associated with a biometric authentication device of the operator, the signature of the electronic report by the operator being authorized only if said operator has been previously identified by the biometric authentication device.

8. The method for collecting data according to claim 1, wherein the aircraft has means for selecting, from a predetermined set of displayable pages, the page to be displayed on said at least one display screen of the aircraft, each given displayed page containing an aircraft operational data set, the mobile terminal being linked to a database (DB2) of data collection scenarios, each given collection scenario in this database corresponding to a given aircraft type itself identifiable via the identification information (ID) of this aircraft, the report generation module being arranged so that upon receipt of the identification information (ID) of the aircraft from which data are to be collected, it obtains from the database a data collection scenario corresponding to that aircraft and, in response to that collection scenario, it issues instructions to the operator (OP) to select the page to be displayed on the at least one aircraft display screen and to acquire an image of that page displayed on the screen.

9. The method for collecting data according to claim 8, wherein the aircraft has a plurality of display screens for displaying said aircraft operational data, the data collection scenario corresponding to that aircraft when executed by the report generation module issuing image acquisition instructions for each of these screens one after the other.

10. The method for collecting data according to claim 8, wherein the optical character recognition (OCR) module is arranged to detect in the acquired image the current page displayed on said at least one aircraft display screen and to issue an instruction to the operator once an image of a page expected in accordance with the scenario has been acquired.

* * * * *